(12) United States Patent  (10) Patent No.: US 8,179,604 B1
Prada Gomez et al.  (45) Date of Patent: May 15, 2012

(54) WEARABLE MARKER FOR PASSIVE INTERACTION

(75) Inventors: Luis Ricardo Prada Gomez, Hayward, CA (US); Liang-Yu Chi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,555

(22) Filed: Sep. 30, 2011

Related U.S. Application Data

(60) Provisional application No. 61/507,184, filed on Jul. 13, 2011.

(51) Int. Cl.
*G02B 27/14* (2006.01)
*G03H 1/00* (2006.01)
*G09G 5/00* (2006.01)
*G02F 1/1335* (2006.01)

(52) U.S. Cl. ............... 359/630; 359/13; 345/8; 349/11

(58) Field of Classification Search .......... 359/409–410, 359/462, 466, 638–639, 13–14, 603–636, 359/404, 407; 345/7, 9; 348/115; 353/11–12, 353/28, 119; 349/11; 340/438, 980, 995.1, 340/815.47, 815.74
See application file for complete search history.

(56) References Cited

U.S. PATENT DOCUMENTS

| 6,101,038 | A | 8/2000 | Hebert et al. |
| 6,172,657 | B1 | 1/2001 | Kamakura et al. |
| 6,236,037 | B1 * | 5/2001 | Asada et al. ............. 250/221 |
| 6,363,160 | B1 | 3/2002 | Bradski et al. |
| 6,625,299 | B1 | 9/2003 | Meisner et al. |
| 6,757,068 | B2 | 6/2004 | Foxlin |

(Continued)

FOREIGN PATENT DOCUMENTS

WO  2010129599  11/2010

OTHER PUBLICATIONS

"Finger tracking for interaction in augmented environments," Dorfmuller-Ulhaas, K.; Schmalstieg, D.; Augmented Reality, 2001. Proceedings. IEEE and ACM International Symposium on, pp. 55-64, 2001, retrieved from the internet May 12, Oct. 30, 2011 from URL http://ieeexplore.ieee.org/stamp/stamp.jsp?tp=&arnumber=970515&isnumber=20930.

(Continued)

*Primary Examiner* — Dawayne A Pinkney
(74) *Attorney, Agent, or Firm* — McDonnell Boehnen Hulbert & Berghoff LLP

(57) ABSTRACT

In accordance with example embodiments, a wearable marker may be used for passive interaction with a wearable computing device. A wearable marker may take the form of a ring, a bracelet, an artificial fingernail configured to be affixed to a fingernail, a decal configured to be affixed to a fingernail, or a glove, among other possible wearable items. A wearable marker may further include an infrared (IR) reflective surface in the form of a surface pattern that is substantially optically invisible. A wearable computing device may include a head-mounted display (HMD) equipped with an IR camera device capable of detecting IR radiation reflected from the surface pattern on a wearable marker. The HMD and the IR camera device can function together to track position and motion of the wearable marker via reflection, and by doing so can recognize known patterns of motion that correspond to known hand gestures.

19 Claims, 9 Drawing Sheets

U.S. PATENT DOCUMENTS

| | | |
|---|---|---|
| 6,771,294 B1 | 8/2004 | Pulli et al. |
| 7,301,648 B2 | 11/2007 | Foxlin |
| 7,787,992 B2 | 8/2010 | Pretlove et al. |
| 7,920,102 B2 | 4/2011 | Breed |
| 2004/0193413 A1 | 9/2004 | Wilson et al. |
| 2005/0061890 A1 | 3/2005 | Hinckley |
| 2007/0273610 A1 | 11/2007 | Baillot |
| 2008/0266323 A1 | 10/2008 | Biocca et al. |
| 2009/0300535 A1 | 12/2009 | Skourup et al. |
| 2010/0066676 A1 | 3/2010 | Kramer et al. |
| 2010/0182340 A1 | 7/2010 | Bachelder et al. |
| 2011/0007035 A1 | 1/2011 | Shai |
| 2011/0007081 A1 | 1/2011 | Gordon |
| 2011/0035684 A1 | 2/2011 | Lewis et al. |

OTHER PUBLICATIONS

"Wearable Virtual Tablet: Fingertip Drawing on a Portable Plane-object using an Active-Infrared Camera" Norimichi Ukita and Masatsuga Kidode, 2004, retrieved from the internet May 11, 2011 from URL http://portal.acm.org/citation.

"A robust hand tracking for gesture-based interaction of wearable computers," Yang Liu, Yunde Jia, Wearable Computers, 2004. ISWC 2004. Eighth International Symposium on, vol. 1, pp. 22-29, Oct. 31-Nov. 3, 2004, retrieved from the internet May 12, 2011 from URL http://ieeexplore.ieee.org/stamp/stamp.jsp?tp=&arnumber=1364685&isnumber=29895.

"Vision-Based Gesture Recognition: A Review" Ying Wu, Thomas S. Huang, Jan. 1, 1999, retrieved from the internet May 11, 2011 from URL http://www.springerlink.com/content/vp89kq62x5qg96lf/.

"The perceptive workbench: Computer-vision-based gesture tracking, object tracking, and 3D reconstruction for augmented desks" Thad Starner, Bastian Leibe, David Minnen, Tracy Westyn, Amy Hurst and Justin Weeks, Machine Vision and Applications, 2003, vol. 14, No. 1, pp. 59-71, retrieved from the interbet May 11, 2011 from URL http://www.springerlink.com/content/ld76dwkhnntq81pl/.

"Real-Time American Sign Language Recognition Using Desk and Wearable Computer Based Video" Starner, T.; Weaver, J.; Pentland, A., Pattern Analysis and Machine Intelligence, IEEE Transactions on, vol. 20, No. 12, pp. 1371-1375, Dec. 1998, retrieved from the internet May 11, 2011 from URL http://ieeexplore.ieee.org//xpls/abs_all.jsp?arnumber=735811.

"Augmented Reality Through Wearable Computing" Thad Starner, Steve Mann, Bradley Rhodes, Jeffrey Levine, 1997, retrieved from the internet May 11, 2011 from URL http://citeseerx.ist.psu.edu/viewdoc/download?doi=10.1.1.84.1682&rep=rep1&type=pdf.

"Tracking of User Position and Orientation by Stereo Measurement of Infrared Markers and Orientation Sensing," Masaki Maeda, Takefumi Ogawa, Kisyoshi Kiyokawa, Haruo Takemura, iswc, pp. 77-84, Eighth IEEE International Symposium on Wearable Computers, Oct. 31-Nov. 3, 2004, retrieved from the internet May 12, 2011 from URL http://www.computer.org/portal/web/csdl/doi/10.1109/ISWC.2004.46.

"Constellation: a wide-range wireless motion-tracking system for augmented reality and virtual set applications" Eric Foxlin, Michael Harrington, George Pfeifer, Proceedings of the 25th annual conference on Computer graphics and interactive techniques, 1998, retrieved from the internet May 12, 2011 from URL http://portal.acm.org/citation.cfm?id=280937.

"Finger tracking for interaction in augmented environments," Dorfmuller-Ulhaas, K.; Schmalstieg, D.; Augmented Reality, 2001. Proceedings. IEEE and ACM International Symposium on, pp. 55-64, 2001, retrieved from the internet May 12, Oct. 30, 2011 from URL http://ieeexplore.ieee.org/stamp/jsp?tp=&arnumber=970515&isnumber=20930.

"Wearable Virtual Tablet: Fingertip Drawing on a Portable Plane-object using an Active-Infrared Camera" Norimichi Ukita and Masatsugu Kidode, 2004, retrieved from the internet May 11, 2011 from URL http://portal.acm.org/citation.

"The perceptive workbench: Computer-vision-based gesture tracking, object tracking, and 3D reconstruction for augmented desks" Thad Starner, Bastian Leibe, David Minnen, Tracy Westyn, Amy Hurst and Justin Weeks, Machine Vision and Applications, 2003, vol. 14, No. 1, pp. 59-71, retrieved from the internet May 11, 2011 from URL http://www.springerlink.com/content/ld76dwkhnntq81pl/.

"Real-Time American Sign Language Recognition Using Desk and Wearable Computer based Video" Starner, T.; Weaver, J.; pentland, A., Pattern Analysis and Machine Intelligence, IEEE Transactions on , vol. 20, No. 12, pp. 1371-1375, Dec. 1998, retrieved from the internet May 11, 2011 from URL http://ieeexplore.ieee.org//xpls/abs_all.jsp?arnumber=735811.

"Augmented Reality Through Wearable Computing" Thad Starner, Steve Mann, Bradley Rhodes, Jeffrey Levine, 1997, retrieved from the internet May 11, 2011 from URL http://citeseerx.ist.psu.edu/viewdoc/download?doi=10.1.84.1682&rep=rep1&type=pdf.

"Tracking of User Position and Orientation by Stereo Measurement of Infrared Markers and Orientation Sensing," Masaki Maeda, Takefumi Ogawa, Kisyoshi Kiyokawa, Haruo Takemura, iswc, pp. 77-84, Eighth IEEE International Symposium on Wearable Computers. Oct. 31-Nov. 3, 2004, retrieved from the internet May 12, 2011 from URL http://www.computer.org/portal/web/csdl/doi/10.1109/ISWC.2004.46.

"Computer Vision-Based Gesture Recognition for an Augmented Reality Interface" Moritz Störring, Thomas B. Moeslund, Yong Liu, and Erik Granum, In 4th IASTED International Conference on Visualization, Imaging, and Image Processing, Sep. 2004, retrieved from the Internet May 11, 2011 from URL [http://citeseerx.ist.psu.edu/viewdoc/summary?doi=10.1.1.73.104].

\* cited by examiner

WEARABLE MARKER FOR PASSIVE INTERACTION

CROSS-REFERENCE TO RELATED APPLICATIONS

This application claims priority under 35 U.S.C. §119(e) to U.S. Provisional Patent Application Ser. No. 61/507,184, filed on Jul. 13, 2011, which is incorporated herein in its entirety by reference.

BACKGROUND

Unless otherwise indicated herein, the materials described in this section are not prior art to the claims in this application and are not admitted to be prior art by inclusion in this section.

Various technologies can be utilized to provide users with electronic access to data and services in communication networks, as well as to support communication between users. For example, devices such as computers, telephones, and personal digital assistants (PDAs) can be used to exchange information over communication networks including the Internet. Communication networks may in turn provide communication paths and links to servers, which can host applications, content, and services that may be accessed or utilized by users via communication devices. The content can include text, video data, audio data and/or other types of data.

SUMMARY

In one aspect, an example embodiment presented herein provides a computer-implemented method comprising: at a wearable head-mount display (HMD), detecting infrared (IR) radiation reflected from an IR reflective surface on a hand-wearable item, the IR reflective surface being in the form of a particular surface pattern and being substantially optically invisible; decoding the particular surface pattern from the detected IR radiation to obtain an item identifier; determining that the item identifier matches a predetermined identifier associated with the wearable HMD; and responsive to determining that the item identifier matches the predetermined identifier, tracking position and motion of the hand-wearable item relative to the wearable HMD by measuring position and motion of the particular surface pattern relative to the wearable HMD via the detected IR radiation.

In another aspect, an example embodiment presented herein provides a wearable head-mounted display (HMD) comprising: means for detecting infrared (IR) radiation reflected from an IR reflective surface on a hand-wearable item, wherein the IR reflective surface is in the form of a particular surface pattern and is substantially optically invisible; means for decoding the particular surface pattern from the detected IR radiation to obtain an item identifier; means for determining that the item identifier matches a predetermined identifier associated with the wearable HMD; and means for responding to determining that the item identifier matches the predetermined identifier by measuring position and motion of the particular surface pattern relative to the wearable HMD via the detected IR radiation, in order to track position and motion of the hand-wearable item relative to the wearable HMD.

In another aspect, an example embodiment presented herein provides a nontransitory computer-readable medium having instructions stored thereon that, upon execution by one or more processors of a wearable head-mounted display HMD, cause the wearable HMD to carry out functions comprising: detecting infrared (IR) radiation reflected from an IR reflective surface on a hand-wearable item, wherein the IR reflective surface is in the form of a particular surface pattern and is substantially optically invisible; decoding the particular surface pattern from the detected IR radiation to obtain an item identifier; determining that the item identifier matches a predetermined identifier associated with the wearable HMD; and responsive to determining that the item identifier matches the predetermined identifier, tracking position and motion of the hand-wearable item relative to the wearable HMD by measuring position and motion of the particular surface pattern relative to the wearable HMD via the detected IR radiation.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1A:
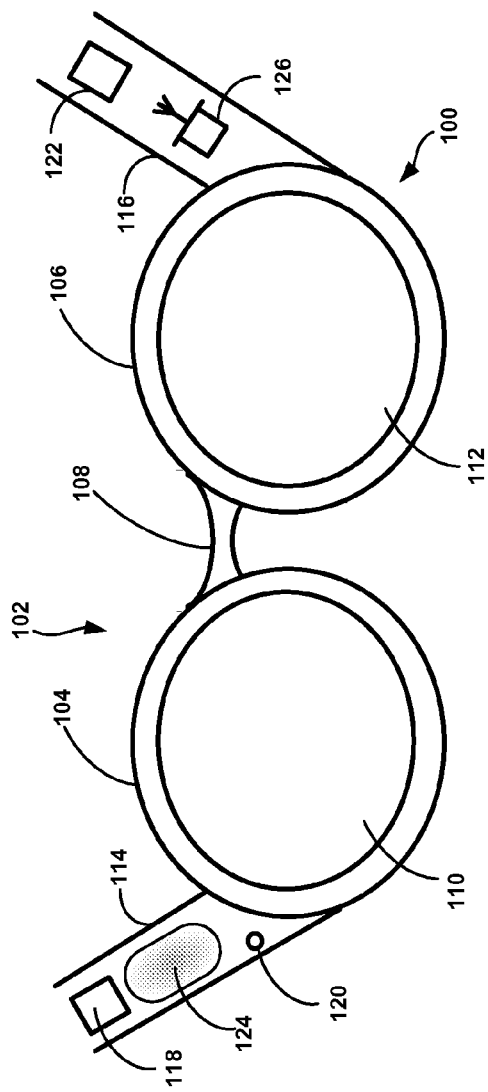
FIG. 1a is a first view of an example wearable head-mounted display for receiving, transmitting and displaying data, in accordance with an example embodiment.

In accordance with example embodiments, a wearable marker may be used for passive interaction with a wearable computing device. A wearable marker may take the form of a ring, a bracelet, an artificial fingernail configured to be affixed to a fingernail, a decal configured to be affixed to a fingernail, or a glove, among other possible wearable items. A wearable marker may further include an infrared (IR) reflective surface in the form of a surface pattern, the IR reflective surface being substantially optically invisible. The surface pattern could include a number, a pattern of lines, a pattern of shapes, an image, or other pictorial design rendering, for example. Being part of the IR reflective surface, the surface pattern may also be substantially optically invisible. Both the IR reflective surface and the included surface pattern may be configured to be visible to (or detectable by) an IR detection device, such as an IR camera or other IR detector via reflected IR radiation.

Also in accordance with example embodiments, a wearable computing device may include a head-mounted display (HMD) having eyeglasses or goggles that can combine computer-generated images displayed on the eye-facing surfaces of lens elements with an actual field of view observable through the lens elements. The capability presenting the combination of the actual, observed field-of-view (FOV) with the displayed, computer-generated images can be complemented or supplemented with various functions and applications, as well as with various forms of user input and sensory data from ancillary wearable computing components, to provide rich and varied experiences and utility for a user or wearer of the HMD.

In an example embodiment, a HMD can be further equipped with an IR camera device capable of detecting IR radiation, and in particular, capable of detecting and recognizing the IR reflective surface pattern on a hand-wearable item (such as a ring) via reflected IR radiation. In addition, the HMD and the IR camera device can function together to track position and motion of the hand-wearable item within a FOV of the HMD, and by doing so can recognize known patterns of motion that correspond to known hand gestures. Recognition of a known pattern of motion can accordingly be used to identify a known hand gesture, which in turn can form a basis for user input to the HMD. For example, a particular gesture could be associated with a particular command, application, or other invokable action on the HMD.

In further accordance with example embodiments, an HMD can be communicatively connected with a communication network, and can exchange data with a server or server system (other device) in the network. In still further accordance with example embodiments, applications and/or commands invoked by hand gestures could involve communication with a server or server system in the communication network. For example, a hand gesture could cause a program running on the wearable HMD to upload and/or download content (e.g., media data) to/from the server.

In still further accordance with example embodiments, the hand-wearable item bearing the IR reflective surface pattern could be configured as multiple items bearing multiple, corresponding pattern components. For example, the hand-wearable item could include multiple rings, multiple artificial fingernails, or multiple fingernail decals. Multiple pattern components could be used support complex gestures, for example ones involving two or more fingers and associated motion. Moreover, the hand-wearable item could take the form of a fashionable or stylish adornment having potential marketing value beyond its function in passive interaction.

2. Example Systems and Network a. Example Wearable Computing System

In accordance with an example embodiment, a wearable computing system may comprise various components, including one or more processors, one or more forms of memory, one or more sensor devices, one or more I/O devices, one or more communication devices and interfaces, and a head-mounted display (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

Although described above as a component of a wearable computing system, it is sometimes convenient to consider an HMD to be (or at least to represent) the wearable computing system. Accordingly, unless otherwise specified, the terms "wearable head-mounted display" (or "wearable HMD") or just "head-mounted display" (or "HMD") will be used herein to refer to a wearable computing system, in either an integrated (unified package) form, a distributed (or partially distributed) form, or other wearable form.

FIG. 1a illustrates an example wearable computing system 100 for receiving, transmitting, and displaying data. In accordance with an example embodiment, the wearable computing system 100 is depicted as a wearable HMD taking the form of eyeglasses 102. However, it will be appreciated that other types of wearable computing devices could additionally or alternatively be used.

As illustrated in FIG. 1a, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed. In addition, at least a portion of each lens elements 110 and 112 may be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, the wearable computing system 100 may be connected to or be integral to a head-mounted helmet structure. Other possibilities exist as well.

The wearable computing system 100 may also include an on-board computing system 118, a video camera 120, a sensor 122, a finger-operable touch pad 124, and a communication interface 126. The on-board computing system 118 is shown to be positioned on the extending side-arm 114 of the eyeglasses 102; however, the on-board computing system 118 may be provided on other parts of the eyeglasses 102. The on-board computing system 118 may include, for example, a one or more processors and one or more forms of memory. The on-board computing system 118 may be configured to receive and analyze data from the video camera 120, the sensor 122, the finger-operable touch pad 124, and the wireless communication interface 126 (and possibly from other sensory devices and/or user interfaces) and generate images for output to the lens elements 110 and 112.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Video cameras with a small form factor, such as those used in cell phones or webcams, for example, may be incorporated into an example of the wearable system 100. Although FIG. 1a illustrates one video camera 120, more video cameras may be used, and each may be configured to capture the same view, or to capture different views. For example, the video camera 120 may be forward facing to capture at least a portion of a real-world view perceived by the user. This forward facing image captured by the video camera 120 may then be used to generate an augmented reality where computer generated images appear to interact with the real-world view perceived by the user.

The video camera 120 may also include IR detection capability, such that it may functionality within an IR region of the electromagnetic spectrum. For example, the operational properties of the video camera 120 described above could apply to IR as well as optical light. As such, the video camera 120 could detect IR radiation reflected from an IR reflective surface pattern on a hand-wearable item (such as ring, or fingernail decal), for example, and track the position and motion of the hand-wearable item in FOV of the video camera 120 via IR radiation reflected from the hand-wearable item. Additionally or alternative, an IR camera device could be included on the wearable HMD as a separate component or separate device from the video camera 120. Other configurations are possible as well.

The sensor 122 is shown mounted on the extending side-arm 116 of the eyeglasses 102; however, the sensor 122 may be provided on other parts of the eyeglasses 102. Although depicted as a single component, the sensor 122 in FIG. 1a could include more than one type of sensor device or element. By way of example and without limitation, the sensor 122 could include one or more of a motion detector (e.g., a gyroscope and/or an accelerometer), a location determination device (e.g., a GPS device), a magnetometer, and an orientation sensor (e.g., a theodolite). Other sensing devices or elements may be included within the sensor 122 and other sensing functions may be performed by the sensor 122.

The finger-operable touch pad 124, shown mounted on the extending side-arm 114 of the eyeglasses 102, may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel to the pad surface, in a direction normal to the pad surface, or both, and may also be capable of sensing a level of pressure applied. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge of the finger-operable touch pad 124. Although not shown in FIG. 1a, the eyeglasses 102 could include one more additional finger-operable touch pads, for example attached to the extending side-arm 316, which could be operated independently of the finger-operable touch pad 124 to provide a duplicate and/or different function.

The communication interface 126 could include an antenna and transceiver device for support of wireline and/or wireless communications between the wearable computing system 100 and a remote device or communication network. For instance, the communication interface 126 could support wireless communications with any or all of 3G and/or 4G cellular radio technologies (e.g., CDMA, EVDO, GSM, UMTS, LTE, WiMAX), as well as wireless local or personal area network technologies such as a Bluetooth, Zigbee, and WiFi (e.g., 802.11a, 802.11b, 802.11g). Other types of wireless access technologies could be supported as well. The communication interface 126 could enable communications between the wearable computing system 100 and one or more end devices, such as another wireless communication device (e.g., a cellular phone or another wearable computing device), a user at a computer in a communication network, or a server or server system in a communication network. The communication interface 126 could also support wired access communications with Ethernet or USB connections, for example.

Figure 1B:
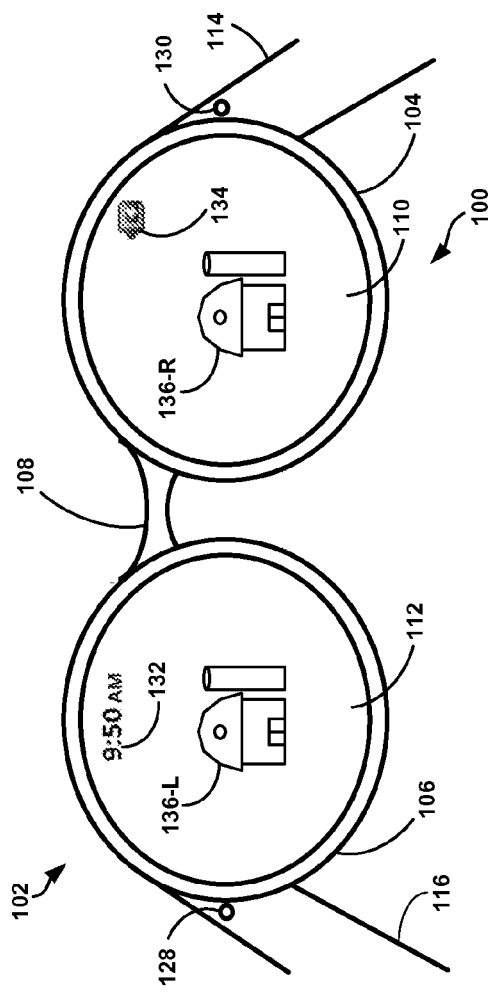
FIG. 1b is a second view of an example wearable head-mounted display of FIG. 1a, in accordance with an example embodiment.

FIG. 1b illustrates another view of the wearable computing system 100 of FIG. 1a. As shown in FIG. 1b, the lens elements 110 and 112 may act as display elements. In this regard, the eyeglasses 102 may include a first projector 128 coupled to an inside surface of the extending side-arm 116 and configured to project a display image 132 onto an inside surface of the lens element 112. Additionally or alternatively, a second projector 130 may be coupled to an inside surface of the extending side-arm 114 and configured to project a display image 134 onto an inside surface of the lens element 110.

The lens elements 110 and 112 may act as a combiner in a light projection system and may include a coating that reflects the light projected onto them from the projectors 128 and 130. Alternatively, the projectors 128 and 130 could be scanning laser devices that interact directly with the user's retinas.

A forward viewing field may be seen concurrently through lens elements 110 and 112 with projected or displayed images (such as display images 132 and 134). This is represented in FIG. 1b by the field of view (FOV) object 136-L in the left lens element 112 and the same FOV object 136-R in the right lens element 110. The combination of displayed images and real objects observed in the FOV may be one aspect of augmented reality, referenced above.

In alternative embodiments, other types of display elements may also be used. For example, lens elements 110, 112 may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

Although not shown in FIGS. 1a and 1b, the wearable system 100 can also include one or more components for audio output. For example, wearable computing system 100 can be equipped with speaker(s), earphone(s), and/or earphone jack(s). Other possibilities exist as well.

While the wearable computing system 100 of the example embodiment illustrated in FIGS. 1a and 1b is configured as a unified package, integrated in the HMD component, other configurations are possible as well. For example, although not explicitly shown in FIGS. 1a and 1b, the wearable computing system 100 could be implemented in a distributed architecture in which all or part of the on-board computing system 118 is configured remotely from the eyeglasses 102. For example, some or all of the on-board computing system 118 could be made wearable in or on clothing as an accessory, such as in a garment pocket or on a belt clip. Similarly, other components depicted in FIGS. 1a and/or 1b as integrated in the eyeglasses 102 could also be configured remotely from the HMD component. In such a distributed architecture, certain components might still be integrated in HMD component. For instance, one or more sensors (e.g., an accelerometer and/or an orientation sensor) could be integrated in eyeglasses 102.

In an example distributed configuration, the HMD component (including other integrated components) could communicate with remote components via the communication interface 126 (or via a dedicated connection, distinct from the communication interface 126). By way of example, a wired (e.g. USB or Ethernet) or wireless (e.g., WiFi or Bluetooth) connection could support communications between a remote computing system and a HMD component. Additionally, such a communication link could be implemented between a HMD component and other remote devices, such as a laptop computer or a mobile telephone, for instance.

Figure 2:
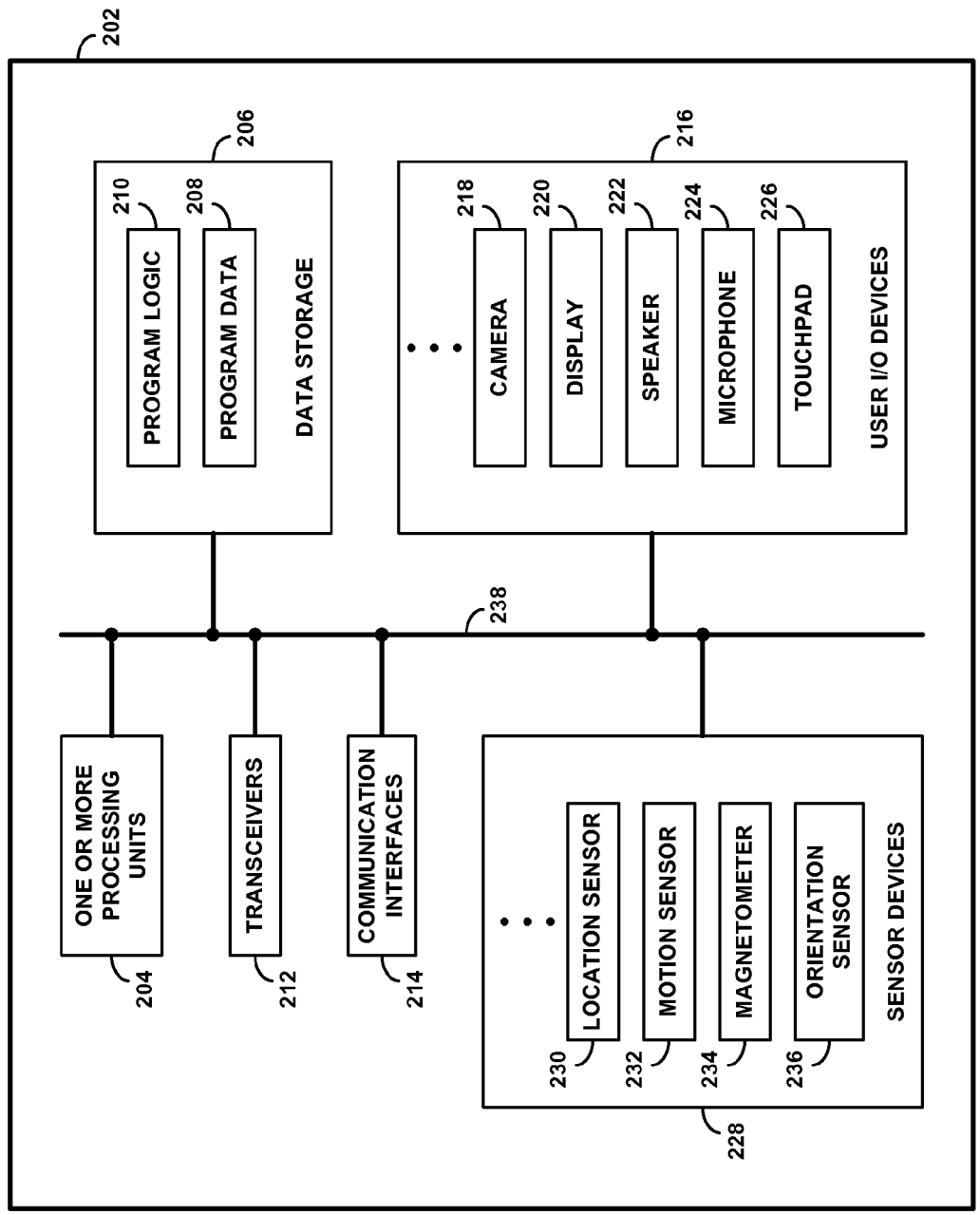
FIG. 2 is block diagram of a wearable head-mounted display, in accordance with an example embodiment.

FIG. 2 is a block diagram depicting functional components of an example wearable computing system 202 in accordance with an example embodiment. As shown in FIG. 2, the example wearable computing system 202 includes one or more processing units 204, data storage 206, transceivers 212, communication interfaces 214, user input/output (I/O) devices 216, and sensor devices 228, all of which may be coupled together by a system bus 238 or other communicative interconnection means. These components may be arranged to support operation in accordance with an example embodiment of a wearable computing system, such as system 100 shown in FIGS. 1a and 1b, or other a wearable HMD.

The one or more processing units 204 could include one or more general-purpose processors (e.g., INTEL microprocessors) and/or one or more special-purpose processors (e.g., dedicated digital signal processor, application specific integrated circuit, etc.). In turn, the data storage 206 could include one or more volatile and/or non-volatile storage components, such as magnetic or optical memory or disk storage. Data storage 206 can be integrated in whole or in part with processing unit 204, as cache memory or registers for instance. As further shown, data storage 206 is equipped to hold program logic 208 and program data 210.

Program logic 208 could include machine language instructions (e.g., software code, firmware code, etc.) that define routines executable by the one or more processing units 204 to carry out various functions described herein. Program data 210 could contain data used or manipulated by one or more applications or programs executable by the one or more processors. Such data can include, among other forms of data, program-specific data, user data, input/output data, sensor data, or other data and information received, stored, retrieved, transmitted, analyzed, or modified in the course of execution of one or more programs or applications.

The transceivers 212 and communication interfaces 214 may be configured to support communication between the wearable computing system 202 and one or more end devices, such as another wireless communication device (e.g., a cellular phone or another wearable computing device), a user at a computer in a communication network, or a server or server system in a communication network. The transceivers 212 may be coupled with one or more antennas to enable wireless communications, for example, as describe above for the wireless communication interface 126 shown in FIG. 1a. The transceivers 212 may also be coupled with one or more and wireline connectors for wireline communications such as Ethernet or USB. The transceivers 212 and communication interfaces 214 could also be used support communications within a distributed-architecture in which various components of the wearable computing system 202 are located remotely from one another. In this sense, the system bus 238 could include elements and/or segments that support communication between such distributed components.

As shown, the user I/O devices 216 include a camera 218, a display 220, a speaker 222, a microphone 224, and a touchpad 226. The camera 218 could correspond to the video camera 120, and include IR detection capability, as described in the discussion of FIG. 1a above. Additionally or alternatively, the camera 218 could represent both the video camera 120 and a separate IR camera device, also as described above. Similarly, the display 220 could correspond to an image processing and display system for making images viewable to a user (wearer) of an HMD. The display 220 could include, among other elements, the first and second projectors 128 and 130 coupled with lens elements 112 and 110, respectively, for generating image displays as described above for FIG. 1b. The touchpad 226 could correspond to the finger-operable touch pad 124, as described for FIG. 1a. The speaker 422 and microphone 224 could similarly correspond to components referenced in the discussion above of FIGS. 1a and 1b. Each of the user I/O devices 216 could also include a device controller and stored, executable logic instructions, as well as an interface for communication via the system bus 238.

The sensor devices 228, which could correspond to the sensor 122 described above for FIG. 1a, include a location sensor 230, a motion sensor 232, a magnetometer 234, and an orientation sensor 236. The location sensor 230 could correspond to a Global Positioning System (GPS) device, or other location-determination device (e.g. mobile phone system triangulation device, etc.). The motion sensor 232 could correspond to an accelerometer or one or more gyroscopes.

The orientation sensor 236 could include a theodolite for determining an angular orientation of a reference pointing direction of the HMD with respect to a local terrestrial coordinate system. For instance, the orientation sensor could determine an altitude angle with respect to horizontal and an azimuth angle with respect to geographic (or geodetic) North of a forward pointing direction of the HMD. Other angles and coordinate systems could be used as well for determining orientation.

The magnetometer 234 could be used to determine the strength and direction of the Earth's magnetic (geomagnetic) field as measured at a current location of the HMD. The magnetometer could be used as a compass, possibly in conjunction with the orientation sensor for determining the azimuth angle.

Each of the sensor devices 228 could also include a device controller and stored, executable logic instructions, as well as an interface for communication via the system bus 238.

It will be appreciated that there can be numerous specific implementations of a wearable computing system or wearable HMD, such as the wearable computing system 202 illustrated in FIG. 2. Further, one of skill in the art would understand how to devise and build such an implementation.

b. Example Network

In an example embodiment, an HMD can support communications with a network and with devices in or communicatively connected with a network. Such communications can include exchange of information between the HMD and another device, such as another connected HMD, a mobile computing device (e.g., mobile phone or smart phone), or a server. Information exchange can support or be part of services and/or applications, including, without limitation, uploading and/or downloading content (e.g., music, video, etc.), and client-server communications, among others.

Figure 3:
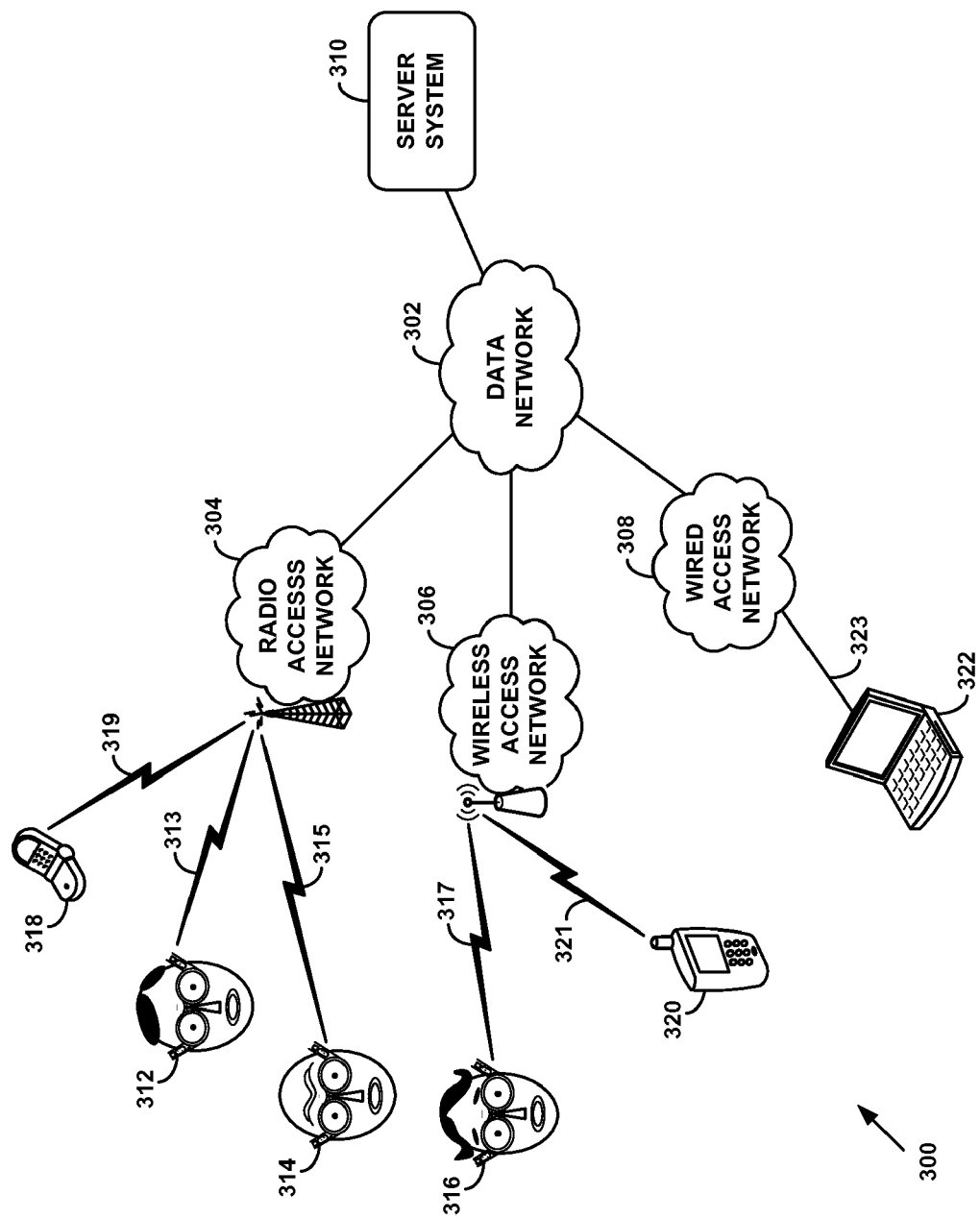
FIG. 3 is a simplified block diagram of a communication network, in accordance with an example embodiment.

FIG. 3 illustrates one view of a network 300 in which one or more HMDs could engage in communications. As depicted, the network 300 includes a data network 302 that is connected to each of a radio access network (RAN) 304, a wireless access network 306, and a wired access network 308. The data network 302 could represent the one or more interconnected communication networks, such as or including the Internet. The radio access network 304 could represent a service provider's cellular radio network supporting, for instance, 3G and/or 4G cellular radio technologies (e.g., CDMA, EVDO, GSM, UMTS, LTE, WiMAX). The wireless access network 306 could represent a residential or hot-spot wireless area network supporting, such as, Bluetooth, Zig-Bee, and WiFi (e.g., 802.11a, 802.11b, 802.11g). The wired access network 308 could represent a residential or commercial local area network supporting, for instance, Ethernet.

The network 300 also includes a server system 310 connected to the data network 302. The server system 310 could represent a website or other network-based facility for providing one or another type of service to users. For instance, in accordance with an example embodiment, the server system 310 could host an online social networking service or website. As another example, the server system 310 could provide a network-based information search service.

FIG. 3 also shows various end-user and/or client devices connected to the network 300 via one of the three access networks. By way of example, an HMD 312 is connected to the RAN 304 via an air interface 313 (e.g., a 3G or 4G technology), and an HMD 314 is connected to the RAN 304 via an air interface 315 (e.g., a 3G or 4G technology). Also by way of example, an HMD 316 is connected to the wireless access network 306 via an air interface 317 (e.g., a WiFi technology). In addition and also by way of example, a mobile phone 318 is shown connected to the RAN 304 via an air interface 319, a smart phone 320 is shown connected to the wireless access network 306 via an air interface 321, and a laptop computer 322 is shown connected to the wired access network 308 via a wired interface 323. Each of the end-user devices could communicate with one or another network-connected device via its respective connection with the network. It could be possible as well for some of these end-user devices to communicate directly with each other (or other end-user devices not shown).

Each of the HMDs 312, 314, and 316 is depicted as being worn by different user (each user being represented by a cartoon face) in order to signify possible user-related variables, circumstances, and applications that may be associated with each HMD. For instance, the HMD 312 could at one time upload content to an online social networking service, whereas the HMD 314 could at the same or another time send a request to a network-based information search service. Other examples are possible as well. However, for the purposes of most of the discussion herein it is usually sufficient to reference only an HMD without referencing the user (or wearer) the HMD. Explicit reference to or discussion of a user (or wearer) of an HMD will be made as necessary.

c. Example Server System

Figure 4A:
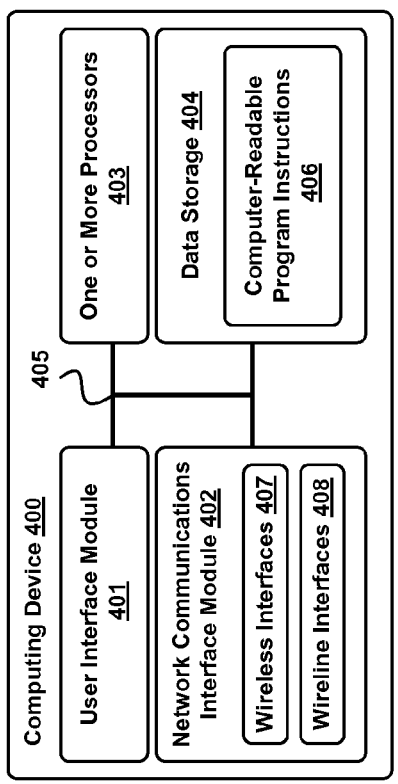
FIG. 4a is a block diagram of a computing device, in accordance with an example embodiment.
Figure 4B:
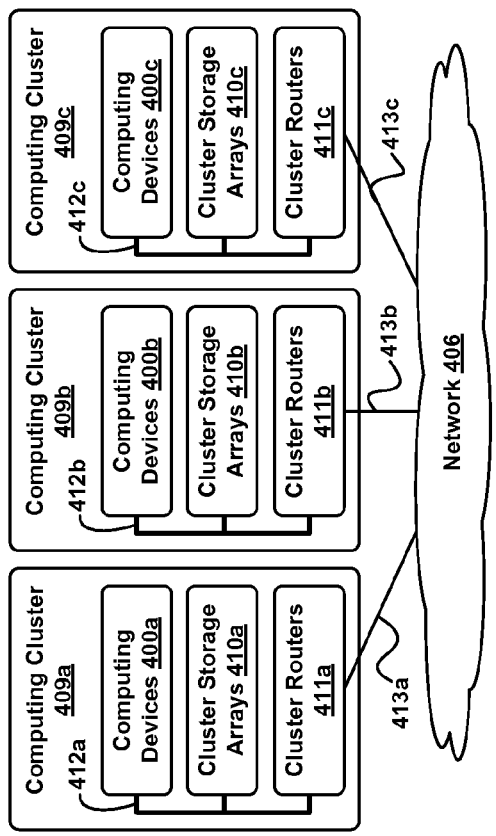
FIG. 4b depicts a network with clusters of computing devices of the type shown in FIG. 4a, in accordance with an example embodiment.

A network server, such as the server system 310 in FIG. 3, could take various forms and be implemented in one or more different ways. FIGS. 4a and 4b illustrate two example embodiments of a server system: an integrated system including a representative computing device (FIG. 4a), and a distributed system (FIG. 4b) including multiple representative computing devices, as well as additional system elements, communicatively connected together.

FIG. 4a is a block diagram of a computing device 400 in accordance with an example embodiment. The computing device 400 can include a user interface module 401, a network-communication interface module 402, one or more processors 403, and data storage 404, all of which can be linked together via a system bus, network, or other connection mechanism 405.

The user interface module 401 can be operable to send data to and/or receive data from external user input/output devices. For example, the user interface module 401 can be configured to send/receive data to/from user input devices such as a keyboard, a keypad, a touch screen, a computer mouse, a track ball, a joystick, and/or other similar devices, now known or later developed. The user interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 401 can also be configured to generate audible output(s), such as a speaker, speaker jack, audio output port, audio output device, earphones, and/or other similar devices, now known or later developed.

The network-communications interface module 402 can include one or more wireless interfaces 407 and/or wireline interfaces 408 that are configurable to communicate via a network, such as the network 302 shown in FIG. 3. The wireless interfaces 407 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 408 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 402 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 403 can include one or more general purpose processors and/or one or more special purpose processors (e.g., digital signal processors, application specific integrated circuits, etc.). The one or more processors 403 can be configured to execute computer-readable program instructions 406 that are contained in the data storage 404 and/or other instructions as described herein.

The data storage 404 can include one or more computer-readable storage media that can be read or accessed by at least one of the processors 403. The one or more computer-readable storage media can include volatile and/or non-volatile storage components, such as optical, magnetic, organic or other memory or disc storage, which can be integrated in whole or in part with at least one of the one or more processors 403. In some embodiments, the data storage 404 can be implemented using a single physical device (e.g., one optical, magnetic, organic or other memory or disc storage unit), while in other embodiments, the data storage 404 can be implemented using two or more physical devices.

Computer-readable storage media associated with data storage 404 and/or other computer-readable media described herein can also include non-transitory computer-readable media such as computer-readable media that stores data for short periods of time like register memory, processor cache, and random access memory (RAM). Computer-readable storage media associated with data storage 404 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 404 and/or other computer-readable media described herein can also be any other volatile or non-volatile storage systems. Computer-readable storage media associated with data storage 404 and/or other computer-readable media described herein can be considered computer readable storage media for example, or a tangible storage device.

The data storage 404 can include computer-readable program instructions 406 and perhaps additional data. In some embodiments, the data storage 404 can additionally include storage required to perform at least part of the herein-described techniques, methods, and/or at least part of the functionality of the herein-described devices and networks.

FIG. 4b depicts a network 406 with computing clusters 409a, 409b, and 409c in accordance with an example embodiment. In FIG. 4b, functions of a network server, such as the server system 310 in FIG. 3, can be distributed among three computing clusters 409a, 409b, and 408c. The computing cluster 409a can include one or more computing devices 400a, cluster storage arrays 410a, and cluster routers 411a, connected together by local cluster network 412a. Similarly, computing cluster 409b can include one or more computing devices 400b, cluster storage arrays 410b, and cluster routers 411b, connected together by local cluster network 412b. Likewise, computing cluster 409c can include one or more computing devices 400c, cluster storage arrays 410c, and cluster routers 411c, connected together by a local cluster network 412c.

In some embodiments, each of computing clusters 409a, 409b, and 409c can have an equal number of computing devices, an equal number of cluster storage arrays, and an equal number of cluster routers. In other embodiments, however, some or all of computing clusters 409a, 409b, and 409c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

Cluster storage arrays 410a, 410b, and 410c of computing clusters 409a, 409b, and 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

The cluster routers 411a, 411b, and 411c in the computing clusters 409a, 409b, and 409c can include networking equipment configured to provide internal and external communications for the computing clusters. For example, the cluster routers 411a in the computing cluster 409a can include one or more internet switching and/or routing devices configured to provide (i) local area network communications between the computing devices 400a and the cluster storage arrays 401a via the local cluster network 412a, and/or (ii) wide area network communications between the computing cluster 409a and the computing clusters 409b and 409c via the wide area network connection 413a to the network 406. The cluster routers 411b and 411c can include network equipment similar to the cluster routers 411a, and the cluster routers 411b and 411c can perform similar networking functions for the computing clusters 409b and 409b that the cluster routers 411a perform for the computing cluster 409a.

3. Using a Wearable Marker for Passive Interaction with a HMD

Example embodiments of a wearable marker for passive interaction with a HMD may be described in terms of operation by considering example use of a wearable marker. For purposes of illustration, a HMD, such as the wearable computing device 100 of FIG. 1, as well as a hand-wearable item bearing a marker, may be taken as being worn by an example user. Also for illustrative purposes, the hand-wearable item may be taken to be a ring. In illustrative operation, the ring bearing the marker can be used by the example user to facilitate passive interaction with the HMD, as described below. It will be appreciated that other forms of hand-wearable items bearing markers may also be used for passive interaction.

a. Detection of an IR Marker

In accordance with an example embodiment, a marker on the hand-wearable item may be detectable in IR radiation, and is therefore referred to herein as an "IR marker." In the context of the present illustrative description, the example user may be taken as wearing a ring bearing an IR marker.

More particularly, an IR marker may have physical properties that make it visible in IR radiation to an IR-sensitive device, such as an IR camera or other IR detector. In further accordance with the example embodiment, the IR marker may be detectable via reflected IR radiation. For example, by illuminating the IR marker with radiation that includes at least a portion of the IR range of the electromagnetic spectrum, IR radiation may be reflected from the IR marker; the reflected IR radiation may then be detectable by the IR camera or other IR detector. Viewed by an optical detector, such as an optical camera or a human eye, the reflected IR radiation would be substantially invisible. As such, the IR marker itself, or at least those characteristics of the IR marker that may be detectable only in IR radiation, would be substantially optically invisible.

Also in accordance with the example embodiment, a wearable HMD may include and/or be equipped with an IR camera device that is capable of detecting an IR marker. Again in the context of the present illustrative description, the example user may be taken as wearing a HMD with an IR camera device capable of detecting the IR marker on the ring worn (in this illustration) by the example user.

An IR camera device may contain components capable of detecting IR radiation, such as a charge-coupled device (CCD) with sensitivity in the IR range of the electromagnetic spectrum. In addition, an IR camera device may include optical elements, such as lenses, for focusing, and electronics for converting detected IR radiation into a form (or forms) suitable for capture, processing, and storage as data, including capture and processing of IR image data and IR video data. By way of example, the IR camera device could correspond to the video camera 120 of the wearable computing device 100 in FIG. 1 above, wherein the video camera 120 is taken to include IR detection capabilities. Alternatively, the wearable HMD could include a separate IR camera device.

In further accordance with the example embodiment, the wearable HMD could also include and/or be equipped with an IR illumination source (note that such a configuration is not necessarily explicitly depicted in the illustrations of the example wearable computing devices 100 or 202 of FIGS. 1 and 2 above). By way of example, the IR illumination source could be an IR beam emitter, similar, for instance, to ones used on TV remote control devices. On the wearable HMD, the IR beam emitter could produce a forward-directed IR beam that could spread open (e.g., in a conical fashion) with distance from the HMD, thereby providing IR illumination in the region covered by the beam. The IR beam emitter could thus serve to illuminate the IR marker when the IR marker is positioned in front of the HMD (i.e., in the FOV of the HMD). This arrangement could be used to ensure sufficient IR illumination (or augment ambient IR illumination) of the IR marker, and correspondingly sufficient reflected IR radiation to be detected by the IR camera device.

In addition, IR beam could be controlled in order to introduce characteristics and properties that could be detected and/or recognized by the IR camera device in the reflected radiation. For instance, the beam could be pulsed with a particular temporal pattern that could then be detected by the IR camera device. Additionally or alternatively, characteristics of the IR spectrum of the beam could be fashioned to be recognizable by the IR camera device in the radiation reflected by the IR marker.

In further accordance with the example embodiment, the IR marker may take the form of an IR reflective surface pattern on a hand-wearable item. The pattern could include, without limitation, one or more alphanumeric characters (e.g., letters, numbers, etc.), a pattern of lines, a pattern of shapes, or an image. Once more in the context of the present illustrative description, the ring worn by the example user may be taken as bearing an IR reflective surface pattern.

More particularly, an IR reflective surface and/or the surface pattern could be formed from an IR reflective material, an IR absorptive material, or a combination of both. By way of example and without limitation, an IR reflective material could be composed of an IR reflective paint, and an IR absorptive material could be composed of an IR absorptive paint. The IR reflective surface and/or the surface pattern could be formed, created, or manufactured in such a manner as to be visible, detectable, or recognizable in IR light by an IR detector (such as an IR camera device). For example, the surface pattern could be a pattern of highly IR reflective and highly IR absorptive regions painted or layered onto a surface of a ring (or other hand-wearable item). Additionally or alternatively, the pattern could include regions of varying degrees of IR reflectivity and IR absorptivity.

The pattern could be visible to an IR camera (or other IR detection device) viewing radiation reflected from the surface. However, the pattern would be substantially or totally invisible as viewed in visible light, for example by a human eye. The wearable item—including the surface upon which the IR pattern is layered—could nevertheless be visible in visible light, at least to the extent that the wearable item is at any given moment illuminated with visible light. It could also happen that there is little or no visible illumination at a particular moment, but still sufficient IR illumination to make the surface pattern visible in reflected IR radiation to an IR camera (or other IR detection device).

Figure 5:
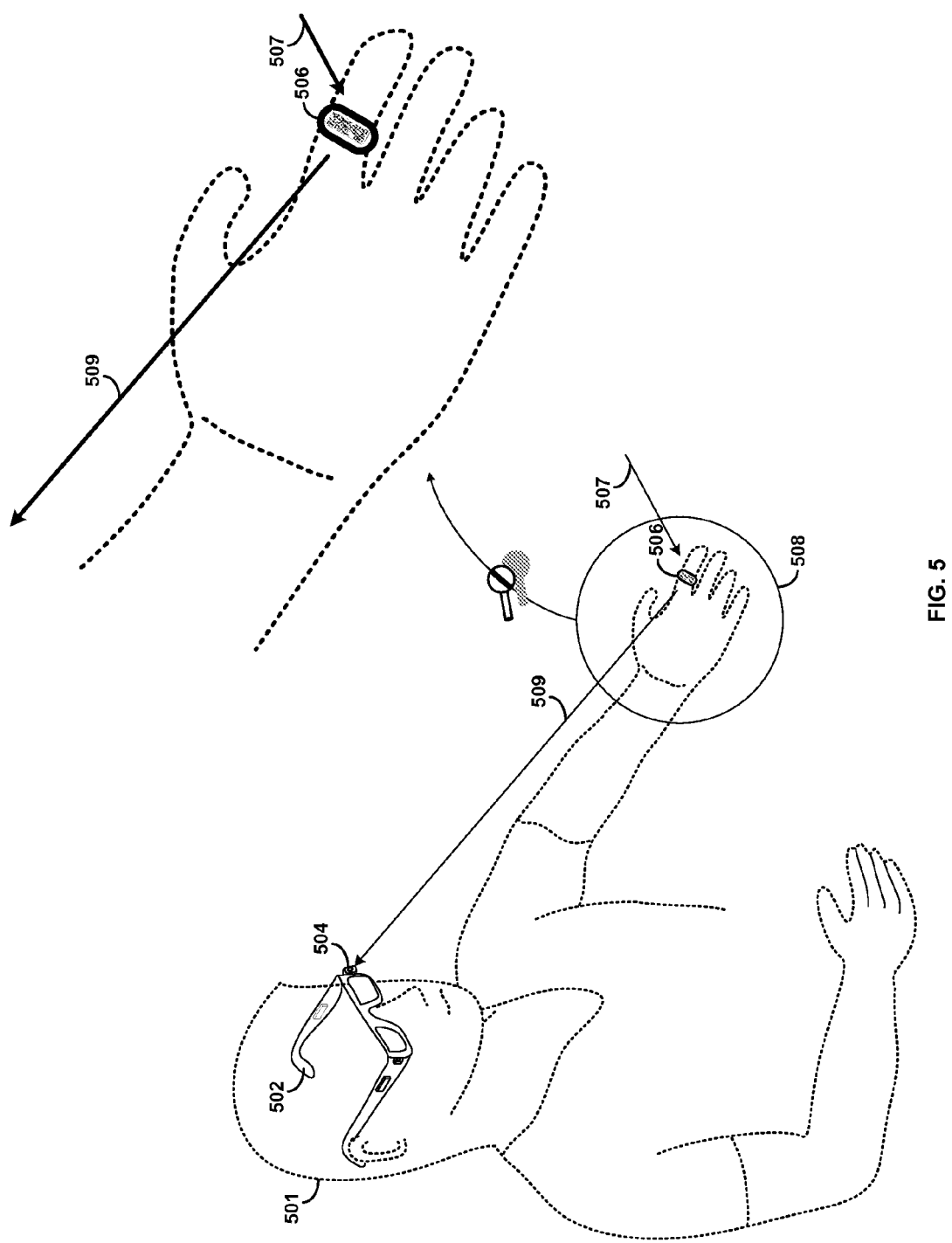
FIG. 5 illustrates a wearable marker for passive interaction with a wearable computing device, according to an example embodiment.

FIG. 5 depicts the context for the illustrative description above of operation of an example embodiment of a wearable marker for passive interaction. As shown, an example user 501 is wearing a HMD 502 that includes an IR camera device 504. The example user 501 is also shown to be wearing a ring 506 on his hand, as indicated within the circle 508. In addition, the ring 506 is depicted as bearing an IR marker. In accordance with example usage, illuminating radiation 507 is incident on the ring 506, resulting in reflected IR radiation 509. The source of the illuminating radiation 507 could be ambient radiation and/or an IR illumination source on the HMD 502. In this illustration, the reflected radiation 509 is directed toward and detected by the IR camera device 504. It will be appreciated that, in practice, some of the IR radiation reflected by the ring 506 may not be directed toward the camera device 504, and may therefore go undetected by the device. However, the reflected IR radiation that is directed toward the camera device 504, as represented by the reflected IR radiation 509, may be detected.

A magnified view of the example user's hand is shown in the upper right portion of FIG. 5, as indicated by the curved arrow pointing from the circle 508 and the icon of a magnifying glass. In addition to duplicating the illustration of the illuminating radiation 507 incident on the ring 506 and the reflected IR radiation 509, the magnified view also more clearly shows the IR marker to be in the form of an IR reflective surface pattern. In accordance with the example embodiment, the IR camera device 504 can detect and/or image the IR surface pattern via the reflected IR radiation 509.

In further accordance with the example embodiment, the HMD 502 may process the image of the IR surface pattern, so as to identify and/or decode the image. More particularly, the image could be decoded in order to obtain an item identifier of the ring (or, more generally, a hand-wearable item bearing an IR marker). For example, the IR reflective pattern could be in the form of a string of letters, numbers, and/or other alphanumeric characters that correspond to an encoded item identifier. The HMD 502 could decode the character string to obtain the item identifier.

As another example, the IR reflective pattern could be in the form a two-dimension shape pattern, such as a "quick response" (QR) code, which consists of black modules arranged in a square pattern on a white background. The information encoded can be text or encoded data, including, for example, an item identifier. Other forms of a pattern-based marker could include, without limitation, a bar code or an image. Upon detecting the QR (or other form of code) in the IR surface pattern, the HMD 502 could decode the character string to obtain the item identifier.

An additional or alternative aspect of decoding of the detected IR surface pattern to obtain an item identifier could be based on a use of controlled IR illumination source, such as an IR beam, by the HMD 502. As described above, an IR beam could be controlled by the wearable HMD 502 in order to introduce known temporal and/or spectral characteristics that could be detected and/or recognized by the IR camera device in the reflected radiation. Including illumination of the IR marker by such a controlled beam in the decoding scheme could introduce additional levels of security and/or privacy into the encode/decoding process and the obtained item identifier.

After obtaining the item identifier of the ring (or other wearable item), the HMD 502 could then determine if the obtained item identifier matches a predetermined identifier associated with the HMD 502. For example, by matching the obtained identifier with the predetermined identifier, the HMD 502 could be able to determine or establish the existence of an association between the ring 506 and the HMD 502.

Establishing the existence of an association between the ring 506 and the HMD 502 could signal the HMD 502 to carry out specific actions based upon detection of the ring 506 (e.g., via reflected IR radiation 509). Establishing the existence of the association between the ring 506 and the HMD 502 could also enable the HMD 502 to distinguish detection of the ring 506 from detection of a different ring or hand-wearable item that might also bear a detectable, but different, IR marker. In the context of the present illustration, for example, establishing the existence of such an association could indicate that both the HMD 502 and the ring 506 are being worn by the same example user 501.

In accordance with the example embodiment, specific actions could be carried out by the HMD 502 upon determining that item identifier obtained by decoding the surface pattern on the ring 506 (or other hand-wearable item) matches the predetermined identifier of the HMD 502. Examples of specific actions that might be carried out by the HMD 502 upon determining that item identifier obtained by decoding the surface pattern on the ring 506 (or other hand-wearable item) matches the predetermined identifier of the HMD 502 include, without limitation, executing an authentication or authorization application that enables and/or permits additional programs or applications to run on the HMD 502 (e.g., on a processor of the HMD 502), executing a specific program or application command triggered by determining the match, and processing video and/or image data of the detected IR marker in order to track position and motion of the IR marker.

Additional programs or applications that are enabled and/or permitted by the authentication or authorization application could be ones for which security and/or privacy is required or desired. Specific commands triggered by determining the match could invoke applications related to passive interaction with the wearable IR marker, for example. Tracking position and motion of the IR marker could, in particular, be related to recognition of, and response to, hand gestures, as described in more detail below.

In further accordance with the example embodiment, the example specific actions described above, as well as others, could also be triggered or invoked based on identifying the decoded obtained item identifier, or some portion thereof, directly with a predetermined command or function on the HMD 502. For example, the decoded obtained item identifier could contain information that is used by the HMD 502 both to determine a match with a predetermined identifier of the HMD 502 (e.g. for the purpose of establishing the existence of an association), as well as to identify a predetermined command pattern (e.g., an authentication command pattern).

b. Tracking a Wearable Marker for Gesture Recognition

In accordance with the example embodiment, in response to determining that the item identifier obtained by decoding the surface pattern on the ring 506 (or other hand-wearable item) matches the predetermined identifier of the HMD 502, the HMD 502 could begin tracking the position and motion of the of the ring 506 with the IR camera device via reflected IR radiation (e.g., the reflected IR radiation 509). In the context of the present illustration, for example, determining the match could signal that both the HMD 502 and the ring 506 are being worn by the same example user 501, and that tracking the position and motion of the of the ring 506 would correspond to tracking a hand gesture of the example user 501.

In further accordance with the example embodiment, the tracked position and motion could be measured as a two-dimensional projection of the ring's spatial motion in an image plane of the IR camera device. By way of example, the image plane could correspond to a CCD array of IR-sensitive pixels. In this configuration, a projection of the motion of the IR marker (e.g. on the ring 506) could be detected as a track of motion across the pixels of the two-dimensional array, and captured as video data, for instance. As just one example, a spiral motion in three-dimensional space could correspond to a circle, ellipse, or open loop when project onto a two-dimensional plane perpendicular to the axis of the spiral. Other three-dimensional trajectories could have more or less complicated two-dimensional projections.

The track of motion of the wearable marker across the image plane of the IR camera device could be captured and/or measured by the HMD 502 to generate a quantitative description or record of the in-plane motion. For instance, the motion observed in-plane motion could be rendered as a sequence of pixel locations. Alternatively, the motion observed in-plane motion could be rendered as in the form of a mathematical function. Other quantitative descriptions could be generated as well. The quantitative description could then be compared with a library or list of hand gestures, also represented in a similar, quantitative form, and stored in one or another form of memory of the HMD 502 (or other wearable computing device). Such a comparison could thereby be used to identify a hand gesture corresponding to the observed motion of the ring 506.

In accordance with the example embodiment, each hand gesture of a library of hand gestures could be stored in a data structure record including a gesture identifier (e.g., a name or description) and an associated a sequence of pixel locations (or other form of quantitative description). The hand gesture library could include a collection of such records, each containing a different hand gesture and associated pixel-location sequence. Upon determination of a track of motion for observed motion of an IR marker on a wearable item (e.g., the ring 506), the HMD 502 could do a table look-up or other form of search in the hand gesture library in order to identify a closest match with one of the stored pixel sequences. In this way, the observed motion could be identified with a known, stored gesture identifier. The identified hand gesture could, in turn, be used to signal or trigger an associated action or application on the HMD 502, for example.

Accordingly, by creating and maintaining a library of hand gestures on an HMD, each associated with an action, application, or an aspect of control thereof, for example, tracking the position and motion of a wearable marker by an IR camera device of the HMD can be used to enable passive interaction with the HMD (or other wearable computing device). Moreover, the larger the library of hand gestures, the more expansive the scope of control via passive interaction available to a user of an HMD using a wearable marker.

In accordance with the example embodiment, a library of hand gestures could be created by generating each hand gesture through a "learning" or recording process. More particularly, a wearable HMD could be placed into a recording mode during which a wearable IR marker is moved in a desired pattern of motion in the FOV of the IR camera device. The tracked motion in the image plane of the IR camera could thereby be recorded as a pre-defined pixel sequence, and an associated gesture identifier could be assigned. The wearable HMD could then exit the recording mode. The newly-recorded pixel sequence and the assigned gesture identifier could thus be stored as an entry in the gesture library. This process could be repeated to increase the inventory of hand gestures in the library. Thereafter, the recorded hand gestures could be available for passive interaction as described above.

Additionally or alternatively, the hand gesture library could be created externally to the wearable HMD, and loaded during system configuration or manufacture, for example.

In further accordance with the example embodiment, the tracked position and motion could be measured as a three-dimensional trajectory of the three-dimensional spatial motion of a wearable marker by combining information from each image plane of two or more IR cameras. For example, an IR device having two IR cameras separated by a baseline could be used to triangulate the distance between each IR camera and the wearable marker (e.g., the ring 506) at discrete and/or continuous phases of motion of the wearable marker in the respective FOVs of the two IR cameras.

Figure 6:
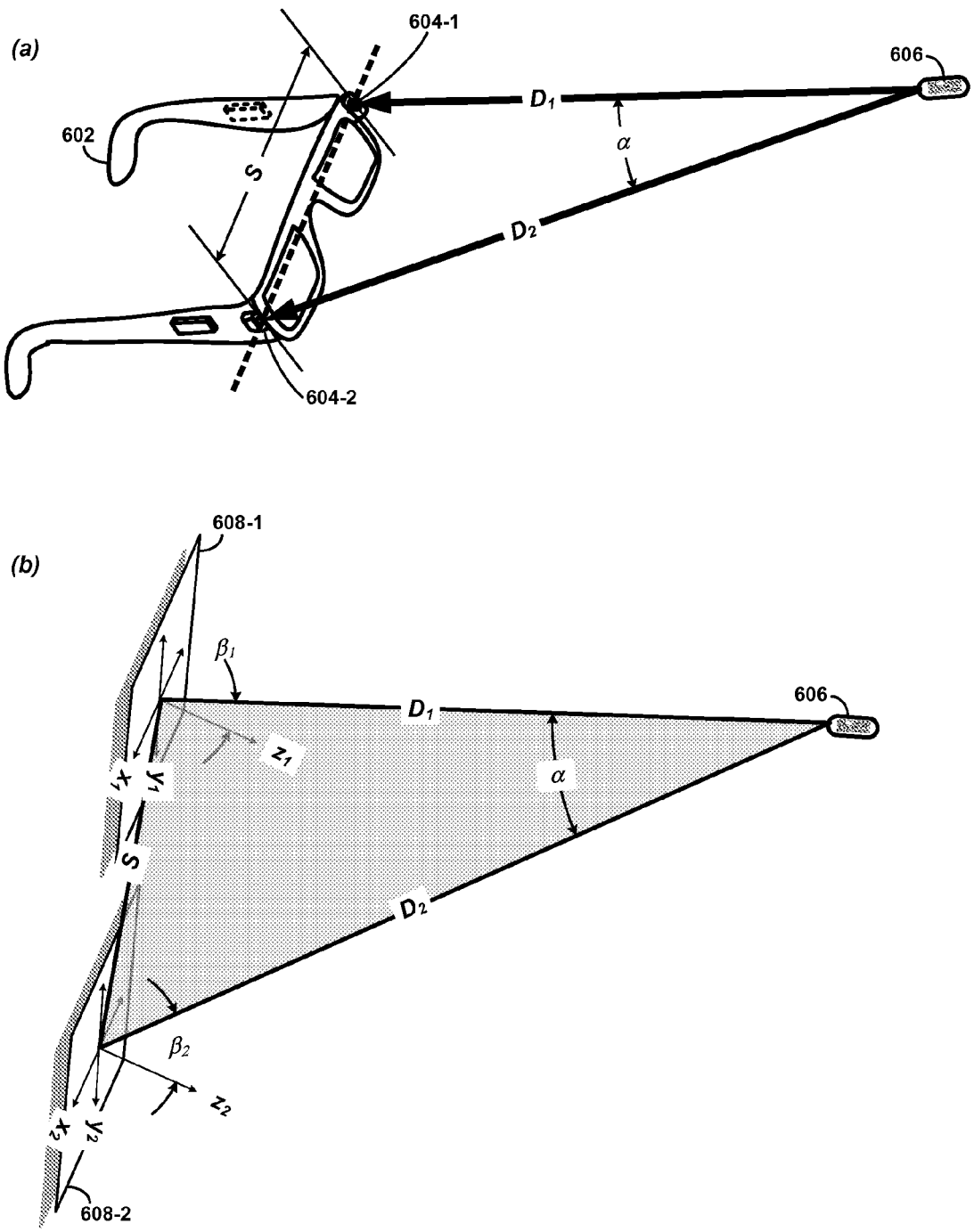
FIG. 6 illustrates triangulation of a wearable marker by a wearable computing device, according to an example embodiment.

FIG. 6 illustrates the principles of triangulation with two IR cameras. The top portion of the figure, labeled "(a)," shows an example HMD 602 having two IR cameras 604-1 and 604-2 situated at opposite ends of a lens frame, both pointing toward a forward FOV of the HMD 602. A distance S separates the two IR cameras, as indicated. This separation distance is referred to as a baseline. Also shown in the top portion (a) of the FIG. 6 is a ring 606 in the forward FOV of the HMD 602. As indicated by a respective arrow pointing from the ring 602 to each of the IR cameras 604-1 and 604-2, the ring 602 is located, by way of example, at a distance $D_1$ from the IR camera 604-1, and at a distance $D_2$ from the IR camera 604-2. As also indicated, the baseline S subtends an angle $\alpha$ at the example distances $D_1$ and $D_2$. Given S, $\alpha$, and a respective line-of-sight direction from each IR camera to the ring 606, the values of $D_1$ and $D_2$ can be computed from elementary trigonometry. Accordingly, a spatial location of the ring 606 with respect to the HMD 602 can be determined by triangulation.

Determination of a respective line-of-sight direction from each IR camera to the ring 606 is illustrated in the bottom portion of FIG. 6. In this portion of the figure (labeled "(b)"), the HMD 602 and the IR cameras 604-1 and 604-2 are replaced with two planes 608-1 and 608-2 representing respective image planes of the IR cameras 604-1 and 604-2. For purposes of illustration, a local rectangular reference frame is shown for each of the planes: axes $x_1$ and $y_1$ lie in the plane 608-1, with axis $z_1$ normal to the plane 608-1; axes $x_2$ and $y_2$ lie in the plane 608-2, with axis $z_2$ normal to the plane 608-2. By way of example, the origin of each reference system is located at the center of the respective image plane (608-1 or 608-2), and the baseline S is taken to be the distance between the two origins.

The distance between the ring 606 and the origin of image plane 608-1 is taken to be $D_1$, and the distance between the ring 606 and the origin of image plane 608-2 is taken to be $D_2$, as indicated. Again, the angle subtended by the baseline S is taken to be a. As shown, the lines $D_1$, $D_2$, and baseline S form a triangle, the plane of which is displayed in gray. In the present illustrative example, the line-of-sight direction from the origin of the image plane 608-1 to the ring 606 is measured as the angle $\beta_1$ between $D_1$ and the $z_1$ axis. Note that the angle $\beta_1$ does not necessarily line in the plane of the gray triangle. Similarly, the line-of-sight direction from the origin of the image plane 608-2 to the ring 606 is measured as the angle $\beta_2$ between $D_2$ and the $z_2$ axis. Again, the angle $\beta_2$ does not necessarily line in the plane of the gray triangle.

The baseline S may be taken as fixed by the geometry of the HMD 602, and more particularly by the placement of the IR cameras 604-1 and 604-2 on the HMD 602. The angles $\beta_1$ and $\beta_2$ can be determined in variety of ways. For example, the particular pixels in a given image frame at which an image of the ring 606 (or other object) is detected can be used to measure an offset from a reference pixel (e.g., at an origin). This, in turn, can be used to compute a line-of-sight angle to the ring 606. Other algorithms can be used to determine the line-of-sight angles as well. Once the angles are determined, the distances $D_1$ and $D_2$, as well as the angle $\alpha$ can be computed from elementary trigonometry, as noted above.

By determining the spatial location of the ring 606 with respect to the HMD 602 continuously and/or at discrete intervals during the course of motion of the ring 606 in the FOV of the HMD 602, the observed motion can be measured quantitatively as a spatial trajectory. Triangulation, as described by way of example above, is one way to do this.

Figure 7:
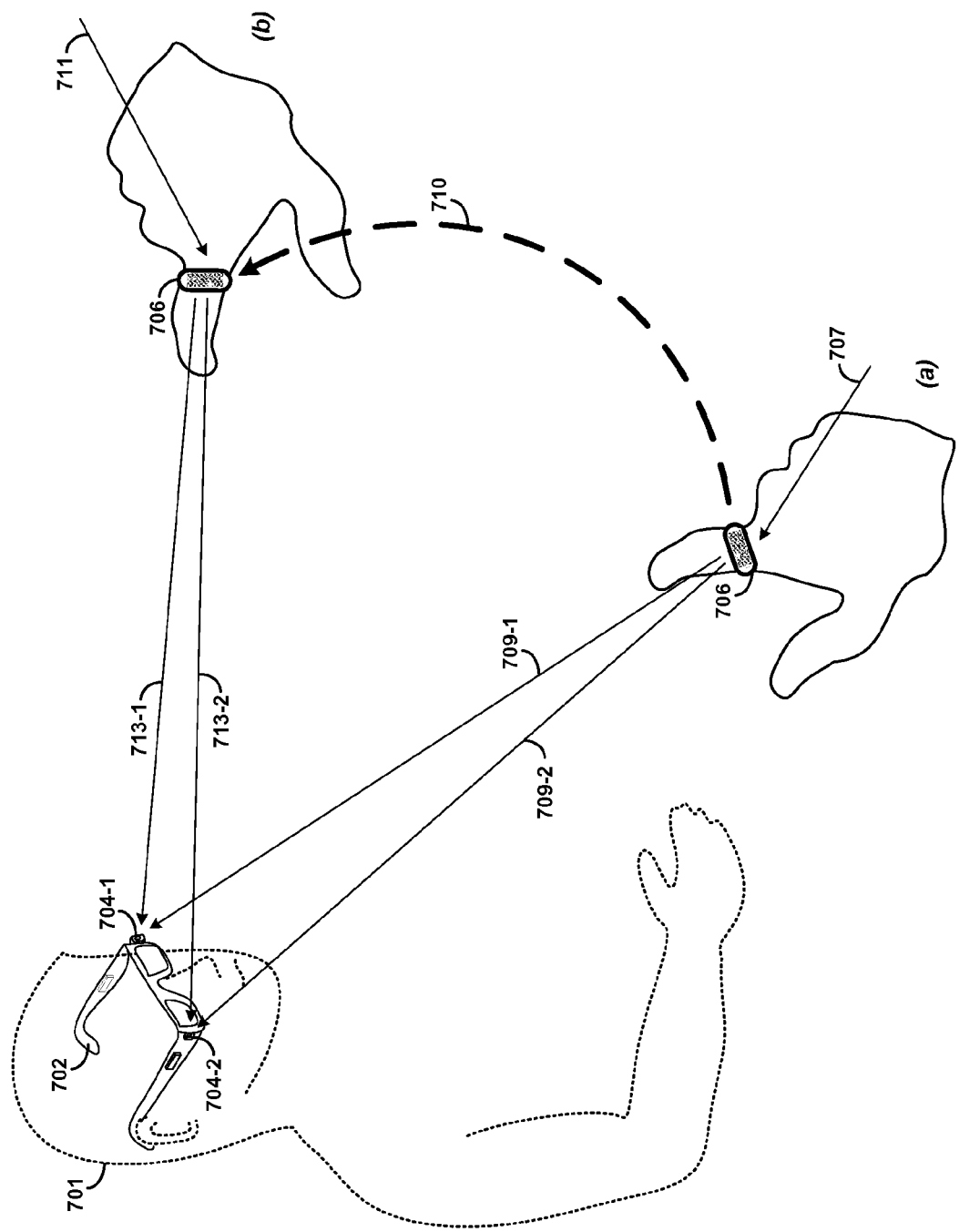
FIG. 7 illustrates tracking of a wearable marker by a wearable computing device, according to an example embodiment.

FIG. 7 illustrates an example of three-dimensional spatial tracking of a ring 706 with an IR marker by a wearable HMD 702. By way of example, the HMD 702 is depicted as being worn by an example user 701. The HMD 702 has two IR cameras 704-1 and 704-2 situated at opposite ends of a lens frame, both pointing toward a forward FOV of the HMD 702.

The ring 706 is shown at two positions of path 710, which may be taken in this illustration as a three-dimensional trajectory of the motion of ring 706. At the first position (labeled "(a)"), the ring 706 is illuminated with IR radiation 707, which is reflected as reflected IR 709-1 directed towards the IR camera 704-1, and as reflected IR 709-2 directed towards the IR camera 704-2. The spatial location of the ring 706 at the first position (a) can be determined by triangulation, for example, as described above. At the second position (labeled "(b)"), the ring 706 is illuminated with IR radiation 711, which is reflected as reflected IR 713-1 directed towards the IR camera 704-1, and as reflected IR 713-2 directed towards the IR camera 704-2. The spatial location of the ring 706 at the second position (b) again can be determined by triangulation. Similar measurements of the spatial location of the ring 706 as it traverses from the first position to the second can be used to determine the path 710.

In a manner similar to that described above for matching the projected, two-dimensional track of a wearable marker in a single image plane with a predetermined, two-dimensional hand gesture, a three-dimensional trajectory of a wearable marker, determined by triangulation (as illustrated in FIG. 7, for example) can be matched against stored, predetermined trajectories associated with known gestures. The principles of matching three-dimensional trajectories can be the same as (or substantially similar to) those described above for the two-dimensional approach. Namely, a library of three-dimensional trajectories may be generated and stored in one or another form of memory of a wearable HMD. Upon determining a measured spatial trajectory of a wearable marker (e.g., the ring 706) in the forward FOV of the HMD (e.g., the HMD 702), the HMD can use a table look-up to make a match and thereby determine a gesture identifier. The gesture identifier could be associated with an action, application, or an aspect of control thereof, thus enabling passive interaction with the HMD (or other wearable computing device) via tracking of the wearable marker.

Tracking the motion of a wearable marker in three dimensions could introduce an increased level of detail and/or nuance in the range or scope of the utility and/or number of gestures that can support passive interaction. For example, motion of a wearable marker measured along the line-of-sight from the HMD could be used to supplement motion measured in the plane of the forward FOV, and thereby modify the interpreted meaning of a recognized gesture.

Figure 8:
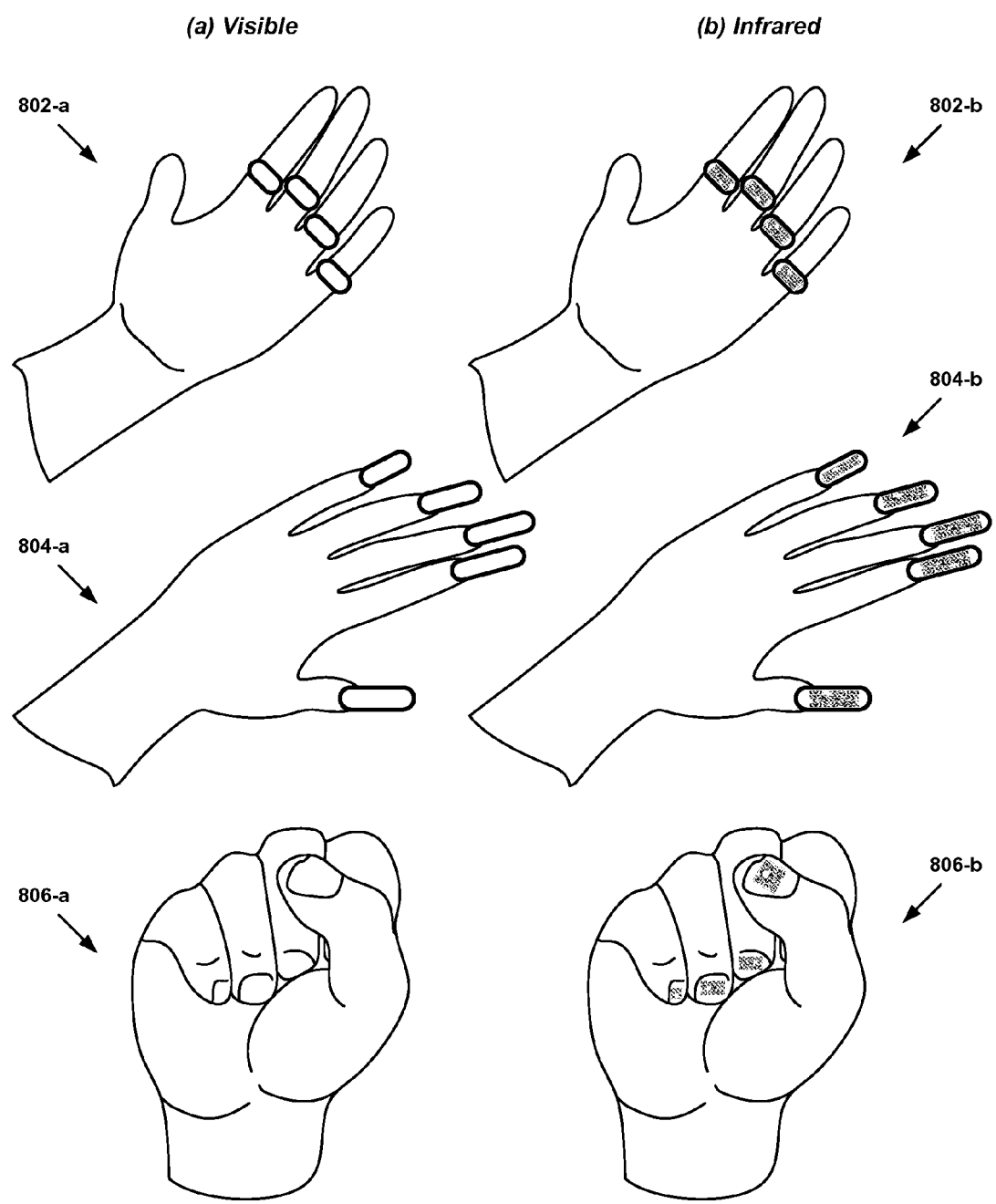
FIG. 8 is illustrates example wearable markers, according to an example embodiment.

In further accordance with the example embodiment, the wearable marker could include multiple wearable-marker elements, each bearing a respective IR marker component. By way of example and without limitation, multiple-element wearable markers could include multiple rings, artificial fingernails, and fingernail decals. FIG. 8 illustrates examples of each, in the form of hand-wearable marker elements. The figure is arranged in two columns, one (column (a)) showing the example hand-wearable markers as viewed by an optical sensor or detector (e.g., an optical camera or a human eye), and the other (column (b)) showing the same hand-wearable markers, but as viewed by an IR sensor or detector (e.g., an IR camera device).

More particularly, example 802-*a* depicts hand-wearable markers in the form of rings worn the fingers of a hand and viewed in visible light, for example by a human eye. Each ring is shown without a pattern or adornment, representing the invisibility to an optical detector (e.g., a human eye) of the IR marker on each ring. Example 802-*b* shows the same example rings on the same hand, but as viewed by an IR sensor or detector (e.g., an IR camera device). As illustrated by way of example, in the IR-sensitive view (b), each ring is seen to bear a marker.

Similarly, example 804-*a* depicts hand-wearable markers in the form of artificial fingernails worn the fingers of a hand and viewed in visible light, for example by a human eye. Each artificial fingernail is shown without a pattern or adornment, representing the invisibility to an optical detector (e.g., a human eye) of the IR marker on each artificial fingernail. Example 804-*b* shows the same example artificial fingernails on the same hand, but as viewed by an IR sensor or detector (e.g., an IR camera device). As illustrated by way of example, in the IR-sensitive view (b), each artificial fingernail is seen to bear a marker.

As the third example of markers, example 806-*a* depicts hand-wearable markers in the form of fingernail decals worn the fingernails of a hand and viewed in visible light, for example by a human eye. Each fingernail decal is shown without a pattern or adornment, representing the invisibility to an optical detector (e.g., a human eye) of the IR marker on each fingernail decal. Example 806-*b* shows the same example fingernail decals on the same hand, but as viewed by an IR sensor or detector (e.g., an IR camera device). As illustrated by way of example, in the IR-sensitive view (b), each fingernail decal is seen to bear a marker.

Using multiple wearable-marker elements, as in examples of FIG. 8, could introduce an increased level of detail and/or nuance in the range or scope of the utility and/or number of gestures that can support passive interaction. For example, each ring of the example 802-*a,b* could convey a different meaning in a gesture. A similar description could apply to the examples 804-*a,b* and 806-*a,b*. Further, the motions of the different wearable-marker elements could be combined in multiple ways to convey multiple, different gestures. For instance, holding up two particular marked fingernails of a hand could signify a different gesture from that of holding two different marked fingernails, or from holding up a different number (e.g., one, three, or four) of fingernails. These examples are illustrative, and not intended to be limiting.

In further accordance with the example embodiment, a wearable marker or multiple-element marker could take the form of a fashionable or stylish adornment. The wearable markers of FIG. 8 provide just a few examples. Rendering the marker itself invisible to an optical detector (such as a human eye) could further enhance the fashionable or stylish aspects of the markers, imbuing them with marketable value beyond the functional properties and roles described above.

4. Example Method

The example embodiments for using a wearable marker for passive interaction described above in operational terms of can be implemented as a method on a wearable HMD. An example embodiment of such a method is described below.

Figure 9:
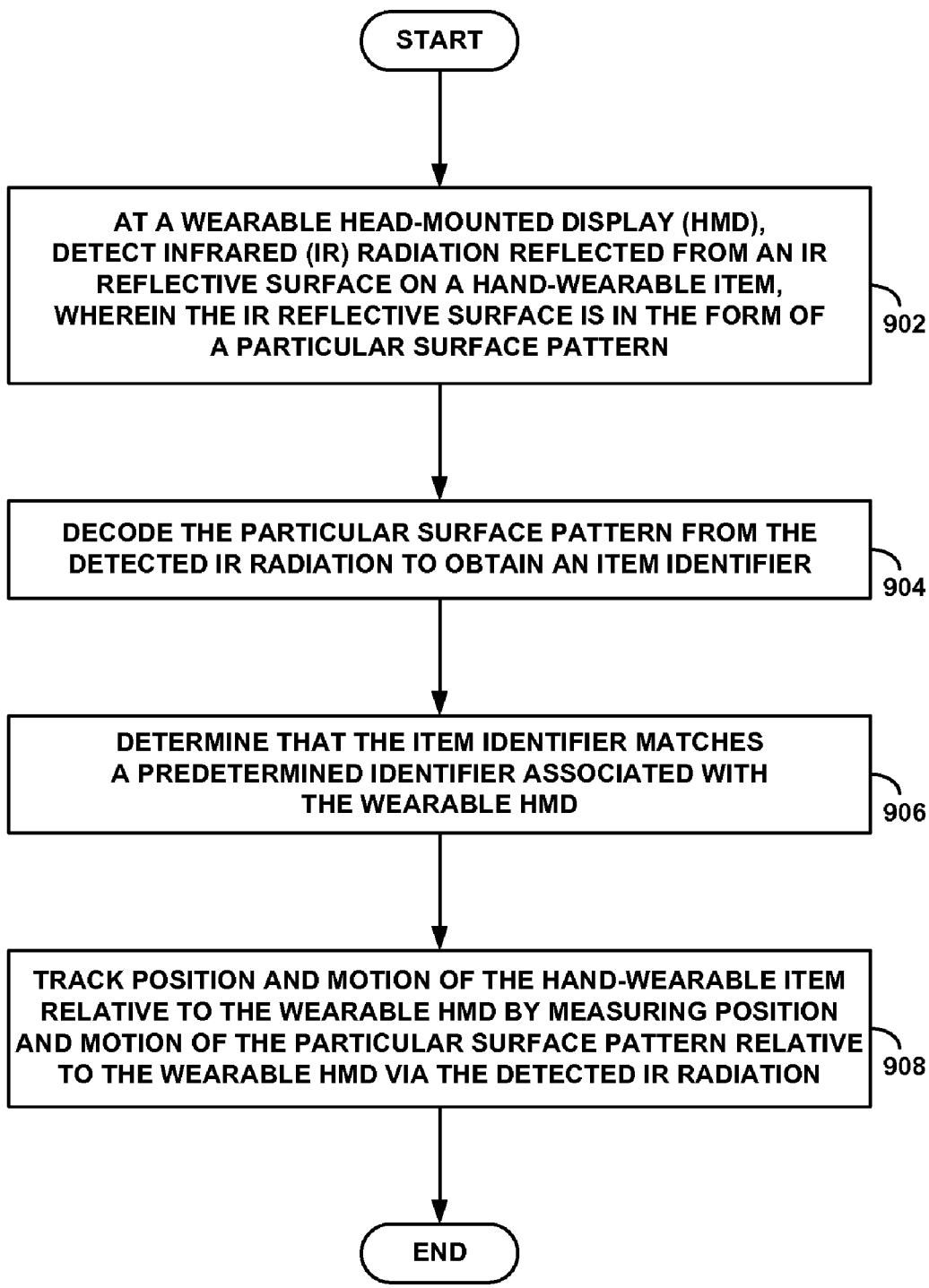
FIG. 9 is a flowchart illustrating an example embodiment of a method in a wearable computing device for passively interacting with a wearable marker.

FIG. 9 is a flowchart illustrating an example embodiment of a method in a wearable computing system, such as a wearable HMD, for using a wearable marker for passive interaction. The illustrated steps of the flowchart could be implemented in the wearable head-mounted display as executable instructions stored in one or another form of memory, and executed by one or more processors of the wearable head-mounted display. Examples of a wearable HMD include the wearable computing system 100 in FIG. 1 and the wearable computing system 202 in FIG. 2. The executable instructions could also be stored on some form of non-transitory tangible computer readable storage medium, such as magnetic or optical disk, or the like, and provided for transfer to the wearable head-mounted display's memory during configuration or other procedure(s) for preparing the wearable head-mounted display for operation.

As shown, at step 902 infrared (IR) radiation reflected from an IR reflective surface on a particular hand-wearable item is detected at a wearable HMD. In accordance with the example embodiment, the IR reflective surface could be in the form of a particular surface pattern that is substantially optically invisible. For example, the particular surface pattern could be or include a particular number, a particular pattern of lines, a particular pattern of shapes, or a particular image. Furthermore, the wearable HMD could include or be equipped with an IR camera device, which could be used to detect the reflected IR radiation.

At step 904, the wearable HMD decodes the particular surface pattern from the detected IR radiation to obtain an item identifier. In accordance with the example embodiment, this action by the wearable HMD could include recognizing the particular number, particular pattern of lines, particular pattern of shapes, or particular image of the particular surface pattern. The recognized number, line pattern, shape pattern, or image could correspond to the item identifier, or be used to determine the item identifier.

Next, at step 906 the wearable HMD determines that the item identifier matches a predetermined identifier associated with the wearable HMD. In accordance with the example embodiment, this matching step signifies to the HMD that there is an association between the wearable marker itself and the wearable HMD. By matching the item identifier with the predetermined identifier, or more particularly, by establishing the association between the wearable marker itself and the wearable HMD, the wearable HMD can distinguish the particular hand-wearable item from a different hand-wearable item, such as one not associated with the wearable HMD.

Finally, at step 908 the wearable HMD tracks the position and motion of the hand-wearable item relative to the wearable HMD in response to having determined the association. In accordance with the example embodiment, the wearable HMD carries out the tracking by measuring position and motion of the particular surface pattern relative to the wearable HMD via the detected IR radiation reflected from the IR reflective surface.

In further accordance with the example embodiment, the IR camera device could include two IR cameras (or other IR detection components) separated by a baseline distance, and the position and motion of the particular surface pattern relative to the wearable HMD could be measured by triangulating a distance between the wearable HMD and the particular surface pattern using the two IR cameras. For example, the two IR cameras could correspond to the IR cameras 604-1 and 604-2 on the wearable HMD 602 shown in FIG. 6. In this example configuration, the baseline distance would be the linear distance separating the two cameras, corresponding approximately to the width of the eyeglasses component of the wearable HMD 604.

Tracking the position and motion of the particular hand-wearable item may in particular facilitate recognition of hand gestures. Accordingly, the position and motion of the particular surface pattern relative to the wearable HMD could be measured contemporaneously with detection of the IR radiation from the IR reflective surface on the hand-wearable item. For example, once an association between the wearable marker and the wearable HMD is established, continued detection of the reflected IR radiation could include triangulating the distance between the wearable HMD and the particular surface pattern. Alternatively, detection could be recorded (e.g., in one or another form of memory of the wearable HMD), and the measurement (e.g., triangulation) carried out thereafter. In practice, the time between recording and measurement could be made sufficiently short as to be effectively or nearly contemporaneous.

In further accordance with the example embodiment, the tracked position and motion of the hand-wearable item could be matched with a pre-determined trajectory in free space, thereby facilitating recognition of hand gestures. For example, a catalog or list of pre-determined trajectories could be stored at the wearable HMD (e.g., in one or another form of memory). Each stored pre-determined trajectory could be a table of sequential spatial coordinates (e.g., x, y, and z values) relative to a reference origin at the wearable HMD. Matching the tracked position and motion of the hand-wearable item with a pre-determined trajectory could then correspond to determining a closest match (e.g. through interpolation or other mathematical algorithm) between a sequence of measured positions and one of the stored sequences.

Once a match is made, the HMD could invoke an executable command based on the pre-determined trajectory of the match. For example, each pre-determined trajectory in the stored catalog or list could have an associated command, also stored in the catalog or list. Upon making the match between the measured position and motion of the hand-wearable item and a particular pre-determined trajectory, the HMD could invoke the command associated with the particular pre-determined trajectory.

In addition to invoking a command corresponding to a hand gesture (e.g., a matched, pre-determined trajectory), the wearable HMD could invoke one or more commands based on identifying the decoded surface patterns with pre-determined patterns respectively associated with executable commands. For example, a catalog or list of executable commands, each having a pre-determined command pattern, could be stored at the wearable HMD (e.g., in one or another form of memory). The wearable HMD could match a given decoded surface pattern with one of the pre-determined command patterns, and thereby identify and execute the associated command.

By way of example, a pre-determined command pattern could be associated with an authentication function of the wearable HMD. Upon identification of the decoded particular surface pattern as a pre-determined authentication pattern associated with the authentication function, the wearable HMD could invoke the authentication function, which could in turn grant permission to carry out or run additional applications or programs on the wearable HMD. For instance, the authentication function, invoked in response to recognizing the decoded particular surface pattern, could serve to authorize the wearable HMD (e.g., a processor of the wearable HMD) to engage in other applications, including other gesture-based and non-gesture-based commands.

In accordance with the example embodiment, the hand-wearable item could be a ring, a bracelet, an artificial fingernail configured to be affixed to a fingernail, a decal configured to be affixed to a fingernail, or a glove, among other possible wearable items (e.g., jewelry, adornments, etc.). The particular surface pattern could then be painted or layered on the item using one or another type of IR and/or IR-reflective paint or marking material. Furthermore, the wearable item could be created to be commercially and/or aesthetically fashionable or stylish, so as to reduce or eliminate undesirable, subjective and/or aesthetic perceptions that could possibly be associated with the hand-wearable item. In such a form, the hand-wearable item could accrue fashion or style value independent and/or above that in connection with its utility in facilitating passive interaction.

In further accordance with the example embodiment, the hand-wearable item could include a plurality of item elements, whereby the particular surface pattern could take the form of a corresponding plurality of different pattern components. Each of the plurality of item elements could in turn bear a different one of the plurality of different pattern components, and decoding the particular surface pattern could be accomplished by decoding two or more of the different pattern components. Moreover, IR radiation reflected from the two or more different pattern components could be detected concurrently, and decoding the two or more of the different pattern components could also be carried out concurrently.

In still further accordance with the example embodiment, the wearable HMD could identify each of the two or more decoded different pattern components as a respective pre-determined command pattern associated with a respective executable command, and responsively invoke each respective executable command on a processor of the wearable HMD.

By way of example and in further accordance with the example embodiment, the plurality of item elements could be a plurality of fingernail decals, each configured to be affixed to a fingernail. Additionally or alternatively, at least one of the plurality of fingernail decals could be an artificial fingernail. It will be appreciated that other multi-item hand-wearable items could be devised.

It will be appreciated that the steps shown in FIG. 9 are meant to illustrate operation of an example embodiment. As such, various steps could be altered or modified, the ordering of certain steps could be changed, and additional steps could be added, while still achieving the overall desired operation.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed:

1. A computer-implemented method comprising:
at a wearable head-mounted display (HMD), detecting infrared (IR) radiation reflected from an IR reflective surface on a hand-wearable item, the IR reflective surface being in the form of a particular surface pattern and being substantially optically invisible;
decoding the particular surface pattern from the detected IR radiation to obtain an item identifier;
determining that the item identifier matches a predetermined identifier associated with the wearable HMD; and
responsive to determining that the item identifier matches the predetermined identifier, tracking position and motion of the hand-wearable item relative to the wearable HMD by measuring position and motion of the particular surface pattern relative to the wearable HMD via the detected IR radiation.

2. The method of claim 1, wherein the hand-wearable item is one of: a ring, a bracelet, an artificial fingernail configured to be affixed to a fingernail, a decal configured to be affixed to a fingernail, and a glove.

3. The method of claim 1, wherein detecting the IR radiation reflected from the IR reflective surface on the hand-wearable item comprises detecting the IR radiation with an IR camera device attached to the wearable HMD.

4. The method of claim 3, wherein the IR camera device comprises two IR detection components separated by a baseline distance,
and wherein measuring the position and motion of the particular surface pattern relative to the wearable HMD comprises triangulating a distance between the wearable HMD and the particular surface pattern using the two IR detection components.

5. The method of claim 1, wherein decoding the particular surface pattern from the detected IR radiation to obtain the item identifier comprises determining that the particular surface pattern includes at least one of: a particular number, a particular pattern of lines, a particular pattern of shapes, and a particular image,
and wherein determining that the item identifier matches the predetermined identifier associated with the wearable HMD comprises distinguishing the hand-wearable item from a different hand-wearable item.

6. The method of claim 1, wherein measuring the position and motion of the particular surface pattern relative to the wearable HMD comprises determining the position and motion of the particular surface pattern relative to the wearable HMD contemporaneously with detecting the IR radiation from the IR reflective surface on the hand-wearable item.

7. The method of claim 1, further comprising:
matching the tracked position and motion of the hand-wearable item with a pre-determined trajectory in free space; and
responsively invoking an executable command on a processor of the wearable HMD based on the matched pre-determined trajectory.

8. The method of claim 1, further comprising:
identifying the decoded particular surface pattern as a pre-determined command pattern associated with an executable command; and
responsively invoking the executable command on a processor of the wearable HMD.

9. The method of claim 1, further comprising:
identifying the decoded particular surface pattern as a pre-determined authentication pattern associated with an authentication function of the wearable HMD; and
responsively invoking the authentication function on a processor of the wearable HMD in order to grant permission to execute an executable application on the processor.

10. The method of claim 1, wherein the hand-wearable item comprises a plurality of item elements and the particular surface pattern comprises a corresponding plurality of different pattern components, each of the plurality of item elements bearing a different one of the plurality of different pattern components,
wherein decoding the particular surface pattern comprises decoding two or more of the different pattern components,
and wherein the method further comprises:
identifying each of the two or more decoded different pattern components as a respective pre-determined command pattern associated with a respective executable command; and
responsively invoking each respective executable command on a processor of the wearable HMD.

11. The method of claim 10, wherein detecting the IR radiation reflected from the IR reflective surface on the hand-wearable item comprises detecting the two or more different pattern components concurrently,
and wherein decoding the two or more of the different pattern components comprises decoding the two or more of the different pattern components concurrently.

12. The method of claim 10, wherein the plurality of item elements comprises a plurality of fingernail decals, each configured to be affixed to a fingernail.

13. The method of claim 12, wherein at least one of the plurality of fingernail decals comprises an artificial fingernail.

14. A wearable head-mounted display (HMD) comprising:
means for detecting infrared (IR) radiation reflected from an IR reflective surface on a hand-wearable item, wherein the IR reflective surface is in the form of a particular surface pattern and is substantially optically invisible;
means for decoding the particular surface pattern from the detected IR radiation to obtain an item identifier;
means for determining that the item identifier matches a predetermined identifier associated with the wearable HMD; and
means for responding to determining that the item identifier matches the predetermined identifier by measuring position and motion of the particular surface pattern relative to the wearable HMD via the detected IR radiation, in order to track position and motion of the hand-wearable item relative to the wearable HMD.

15. The wearable HMD of claim 14, further comprising:
means for matching the tracked position and motion of the hand-wearable item with a pre-determined trajectory in free space; and
means for responsively invoking an executable command on a processor of the wearable HMD based on the matched pre-determined trajectory.

16. The wearable HMD of claim 14, further comprising:
means for identifying the decoded particular surface pattern as a pre-determined command pattern associated with an executable command; and
means for responsively invoking the executable command on a processor of the wearable HMD.

17. The wearable HMD of claim 14, further comprising:
means for identifying the decoded particular surface pattern as a pre-determined authentication pattern associated with an authentication function of the wearable HMD; and
means for responsively invoking the authentication function on a processor of the wearable HMD in order to grant permission to execute an executable application on the processor.

18. The wearable HMD of claim 14, wherein the hand-wearable item comprises a plurality of item elements and the particular surface pattern comprises a corresponding plurality of different pattern components, and each of the plurality of item elements bears a different one of the plurality of different pattern components,
wherein decoding the particular surface pattern comprises decoding two or more of the different pattern components,
and wherein the wearable HMD further comprises:
means for identifying each of the two or more decoded different pattern components as a respective pre-determined command pattern associated with a respective executable command; and
means for responsively invoking each respective executable command on a processor of the wearable HMD.

19. A nontransitory computer-readable medium having instructions stored thereon that, upon execution by one or more processors of a wearable head-mounted display (HMD), cause the wearable HMD to carry out functions comprising:
detecting infrared (IR) radiation reflected from an IR reflective surface on a hand-wearable item, wherein the IR reflective surface is in the form of a particular surface pattern and is substantially optically invisible;
decoding the particular surface pattern from the detected IR radiation to obtain an item identifier;
determining that the item identifier matches a predetermined identifier associated with the wearable HMD; and
responsive to determining that the item identifier matches the predetermined identifier, tracking position and motion of the hand-wearable item relative to the wearable HMD by measuring position and motion of the particular surface pattern relative to the wearable HMD via the detected IR radiation.

* * * * *